(No Model.)

P. GATELY.
THRUST BEARING.

No. 248,445. Patented Oct. 18, 1881.

Attest,
A. B. Doggett,
Louis Cohen.

Inventor,
Patrick Gately,
per Edw. Dummer,
Atty.

UNITED STATES PATENT OFFICE.

PATRICK GATELY, OF NEW YORK, N. Y.

THRUST-BEARING.

SPECIFICATION forming part of Letters Patent No. 248,445, dated October 18, 1881.

Application filed May 14, 1881. (No model.)

*To all whom it may concern:*

Be it known that I, PATRICK GATELY, a citizen of the United States, residing at New York, in the county and State of New York, have invented a new and useful Improvement in Thrust-Bearings, of which the following is a specification, reference being had to the accompanying drawings.

My invention relates to a bearing for receiving the pressure of a shaft-thrust endwise; and it consists in two or more wheels on studs or spindles, the axes of which are at right angles to the axis of the main shaft, a wheel fixed on the main shaft bearing against the said two or more wheels.

My invention further consists in taper bushings and washers on the said studs or spindles, whereby a true fit and adjustment of the wheels thereon are secured, and in other details, all of which are hereinafter described, and specifically pointed out in the claims.

Figure 1:
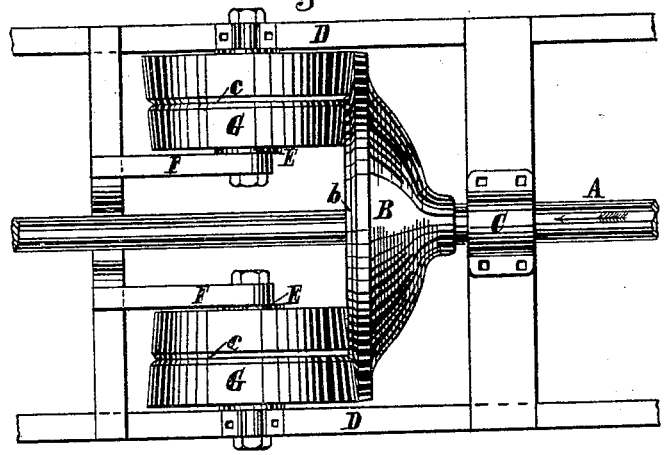
Figure 2:
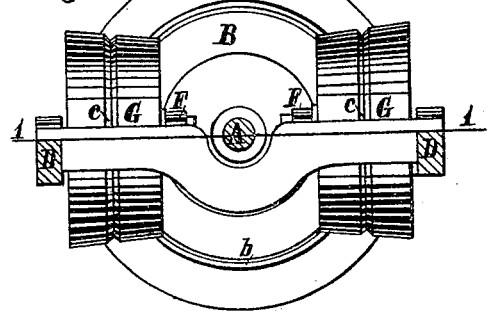
Figure 4:
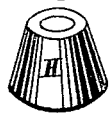
Figure 5:
Figure 3:
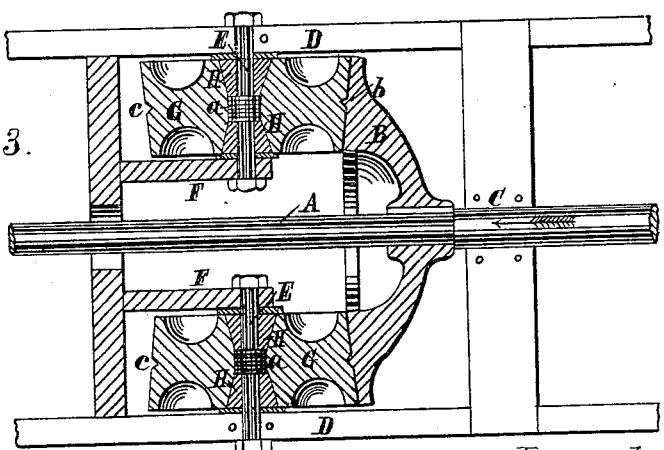

In the drawings, Figure 1 is a plan view of a device embodying my invention. Fig. 2 is an end view of the same. Fig. 3 is a section, taken on line 1 1 in Fig. 2. Fig. 4 is a perspective view of a taper-bushing, and Fig. 5 of a washer, the two last-named figures being drawn on a larger scale than the others.

The shaft A is supposed to have an endwise thrust in the direction of the arrow shown, and may be either horizontal, perpendicular, or inclined. Said shaft has fixed thereon a wheel, B. This wheel I prefer to have beveled, as shown, though it may have a side face at right angles with the shaft A. The shaft A may extend beyond the wheel in both directions, as shown, or in either one direction only. It may have as many bearings, one of which is shown at C, to keep it in central position, as the mechanism, of which it is a part, requires.

In suitable bearings on the supports D D are studs or spindles E E, their axes being at right angles to the axis of the shaft A. These studs or spindles may be further supported at their inner ends by stands F F. On these studs or spindles are the wheels G G, so set in relation to the wheel B that their peripheric surfaces shall bear thereon. When two wheels G G are employed they should be on opposite sides of a line which, extended, is the axis of the shaft A, and when more than two are used they should be so placed as also to receive equally the pressure from the endwise thrust of the shaft A.

Instead of placing the wheels G G directly on the studs or spindles E E, I prefer to have conical bushings H intervene between the wheels and the studs or spindles and set or tapering, as shown.

Between the two bushings for one wheel are thin washers *a*, each of which, as the surfaces of bearing of wheel and bushings wear, may be removed from between the bushings to the outside of one or the other bushing on the stud or spindle, and between a bushing and the support or box for the stud or spindle. When a washer is thus removed from between the bushings the latter are brought nearer together, and if this washer is placed between the outside of the proper one of the bushings and said support or box the proper position of the wheel G is maintained. Thus, by means of the bushings and washers each wheel G may be kept in the best running fit and position.

There is a ridge, *b*, on the wheel B, and there are grooves *c c* in the wheels G G, which the ridge *b* enters as the wheels revolve. The reverse might be adopted—that is, ridges on the wheels G G, and a groove in the wheel B. The ridge or ridges, and grooves or groove, should be of such size, shape, and proportion, relative to the circumference of the wheels, that a ridge may enter and leave a groove freely. These ridges and grooves are for the purpose of keeping the wheels in the best relative position. They may, however, not be considered always necessary, and may in such cases be dispensed with.

Should the wheel B have a side face, straight and at right angles to the shaft A, as mentioned above, then the wheels G G would have their peripheric surfaces straight—that is, parallel with their axes.

The wheels G G may revolve on the studs or spindles, or on the conical bushings thereon, as set forth, or the studs or spindles may themselves revolve in bearings at their ends, being fixed to the wheels.

By my device the sliding friction, and hence the wear, is distributed over a larger bearing-surface than in the ordinary end bearing, and the bearings may be more conveniently and surely oiled. Since the pressure will be against one side of each of the studs or spindles E or of the bushings H, the oil will be pressed out only at this side, while at the other side the oil will be retained, and will keep the bearings constantly lubricated. The bushings and washers, and the ridge and grooves, will assist in keeping the wheels in proper relative position, and in best running fit, as before stated.

I claim as my invention—

1. The combination of the main shaft A, bevel-wheel B, bevel-wheels G, fixed supports D F, studs or spindles E, and conical bushings H, substantially as described.

2. The combination of the bevel-wheel B on the main shaft, and having a ridge, $b$, bevel-wheels G, having grooves $c$, studs or spindles E in fixed supports, and conical bushings H, substantially as specified.

3. In a thrust-bearing, the combination of a bevel-wheel, G, conical bushings H, stud or spindle E, washers $a$, and bearings or boxes for said stud or spindle, on support D, and stand F, so that the washers may be removed from between the bushings to outside of same, and inside of said bearings or boxes, substantially as and for the purpose set forth.

PATRICK GATELY.

Witnesses:
 JAMES H. GILBERT,
 ALEX. CAMERON.